United States Patent Office 3,182,015
Patented May 4, 1965

3,182,015
PROCESS FOR THE SELECTIVE HYDROGENATION OF LIQUID HYDROCARBONS OF THE GASOLINE BOILING RANGE
Walter Krönig and Hans-Joachim Müller, both of Leverkusen, Germany, assignors to Farbenfabriken Bayer Aktiengesellschaft, Leverkusen, Germany, a corporation of Germany
No Drawing. Filed Oct. 25, 1961, Ser. No. 147,433
Claims priority, application Germany, Oct. 28, 1960, F 32,435
6 Claims. (Cl. 208—255)

The subject of the Belgian Patent 589,804 of October 17, 1960, is a process for the selective hydrogenation of cracked gasoline (obtained from the pyrolysis of liquid or liquefiable hydrocarbons) in the trickle phase in the presence of noble metal catalysts, in which the selective hydrogenation is carried out at temperatures below 50° C. and the catalysts are noble metals supported on macroporous carrier materials which have an intrinsic surface of less than 50 m.$^2$/g. with a water absorption capacity of at least 10%.

In the course of further work based on the idea underlying the invention as set forth in said Belgian patent it has now been found that the selective hydrogenation of liquid hydrocarbons in the gasoline boiling range, which hydrocarbons contain unsaturated compounds (particularly those which resinify easily, such as diolefines and also acetylenes) may be carried out by a method in which not the entire reaction chamber but only a part of it, generally about at least ¼, is kept at a temperature below 50° C. while the temperature in the remainder of the reaction chamber is allowed to rise at the most up to about 100° C. and preferably to about 75° C.

It was found quite unexpectedly that when using this method of increasing temperatures, in which generally about at least the first quarter of the reaction chamber is at a temperature below 50° C., no polymers are formed in the reaction chamber, so that the catalyst will not be damaged due to contamination of its surface by polymers. In the presence of this temperature gradient, the hydrogenation in any particular part of the reactor will obviously take place more rapidly than the polymerization there.

The advantage of this method compared with that described in the Belgian patent lies in the fact that even highly unsaturated hydrocarbons may be fed at a considerable rate through the reaction chamber without the quality of the reaction products thereby being impaired. Thus for example the hydrocarbons may be passed through the reaction chamber at a rate of 4–12 or 15 kg. per hour per litre of reaction chamber or even at a higher rate, depending on the quality of the raw material used and on the temperature to which the reaction has been adjusted. When this process is used on a technical scale, the use of higher temperatures is a great advantage, because it is then not necessary to use low boiling point cooling media such as ammonia or propane to keep the reaction temperature down and instead a cooling system using water is sufficient.

The process is carried out in the same way as described in the said Belgian patent. The liquid hydrocarbons in the gasoline boiling range, i.e. boiling in the range of about 30–200° C., which contain the unwanted unsaturated compounds can be obtained, for example, by cracking liquid or liquefiable hydrocarbons at temperatures above 600° C. These hydrocarbons must be free from hydrogen sulphide and easily decomposable organic sulfur compounds, whereas small quantities of organic hydrocarbons which are not easily decomposed, for example thiophenes, are harmless. It is usually sufficient to remove any hydrogen sulphide that may be dissolved in the hydrocarbons by trickling the hydrocarbons through a tower through which gas which is free from hydrogen sulphide and which does not react with the hydrocarbons is passed upwardly, or alternatively small quantities of low boiling products contained in the hydrocarbons, for example $C_3$ or $C_4$ hydrocarbons, may be removed by distillation, thereby removing the hydrogen sulphide with them. It has been found advantageous to redistil these hydrocarbons with the exclusive of air before they are put into the hydrogenation reaction, so that there is a residue, amounting to a few percent, which contains the resins which may have been formed, for example, during the storing of the hydrocarbons.

The process of the invention may advantageously be so carried out that the hydrocarbons to be treated are introduced into the upper portion of the reaction tube and trickle into the reaction chamber over the catalyst and, if desired, over special obstructions or the like built into the reaction chamber. At the same time, hydrogenation gas is introduced into the reaction chamber at a rate depending on the rate at which it is consumed. As already mentioned above, the temperature in the first part of the reactor, e.g. in the first quarter of the reaction chamber, is below 50° C., for example in the region of 25–40° C., and then gradually rises, for example to 75° C. to about 100° C. The liquid hydrocarbons are collected in a vessel in the lower part of the reaction chamber.

The process is carried out, like the process described in the said Belgian patent, in a substantially stationary hydrogen atmosphere. The hydrogen pressure may be, for example, 10–15 atmospheres. When a hydrogen fraction is used which contains residues of other gases, such as methane and/or nitrogen, it may be necessary to release some gas from the separator connected to the reaction chamber, in which separator a certain liquid level is maintained. Generally, however, the substances contained in the hydrogen are sufficiently soluble in the reaction product to maintain a sufficiently high hydrogen partial pressure.

The hydrogenation conditions are so adjusted that the undesired substances, e.g. those which are harmful to the use of the product in engines are sufficiently removed, but harmless olefines are substantially retained. This can be reached mainly by appropriate use of the temperature, throughput and hydrogen pressure. The most suitable conditions can be easily determined in each case, whereby more severe hydrogenation conditions are obtained by using higher temperatures, lower throughputs and higher hydrogen pressures.

Particularly suitable catalysts for the process of the invention are noble metal catalysts, in particular metals of group 8 of the periodic system, especially platinum and palladium, which are precipitated on carriers so that the latter contain 0.05–5% by weight, preferably 0.1–1% by weight of the noble metal. As already mentioned above, the carriers should be absorbent but only contain a small intrinsic surface. Suitable carriers for the process of the invention are, for example, lightly baked clay free from iron or containing only a small quantity of iron, for example broken pieces of clay plates. Pumice stone free from iron, or weakly sintered aluminum oxide or magnesium oxide obtained by heat treatment of iron-free magnesite are also suitable. Charcoal which is free from tar is also a suitable catalyst carrier, and the charcoal may have been treated with steam under such mild conditions that it has dilated the pores while keeping the intrinsic surface below 50 m.$^2$/g. The intrinsic surface area is generally greater than 3 m.$^2$/g.

By using suitable carriers one obtains catalysts which are distinguished by an exceptionally constant hydrogenation activity and which are practically unimpaired in their activity by temporary interruption of hydrogenation. On the other hand, catalysts in which the noble metals are precipitated on carriers having a large intrinsic surface area, e.g. of the order of 100–500 m.$^2$/g. or more, lose their initially high activity after only a few days.

*Example*

Aluminium oxide shaped into rolls of about 2–5 mm. was used as carrier for the hydrogenation catalyst. The intrinsic surface of the material, determined by the BET method, was reduced to 7 m.$^2$/g. by sintering at 1300° C. This material had an absorbency of 35 cc. water per 100 cc. of dry material of displaced volume. This carrier was saturated with palladium chloride. The palladium was then precipitated on the carrier by reduction with hydrazin hydrate. The catalyst obtained in this way contained 1.8% palladium metal. 7 litres of catalyst were introduced into a vertical tube of 40 mm. internal diameter and 6 m. long, which was provided with a cooling jacket.

The raw material used for the selective hydrogenation was a cracked gasoline obtained by pyrolysis at 735° C. of a predominantly aliphatic naphtha. The cracked gasoline was redistilled before hydrogenation so that it did not exceed a gum number of 5 mg./100 cc. A first distillate, amounting to 2% of the cracked gasoline used, and consisting of $C_3$ and $C_4$ hydrocarbons and containing all the hydrogen sulphide originally present in the cracked gasoline was removed, so that the redistilled petrol contained no hydrogen sulphide. It was cooled to 25° C. and led through an impact separator to remove traces of water emulsified in it. This pretreated cracked gasoline was fed into the top of the reactor at the rate of 56 kg. per hour. Hydrogen, sufficient to maintain a pressure of 25 atmospheres, was also introduced into the top of the reactor. The material introduced for the reaction trickled down through the substantially stationary hydrogen atmosphere and over the catalyst and was collected in a separator below the reactor. A certain liquid level was maintained in this separator and gas was not released therefrom. The cooling water of the cooling jacket was so adjusted that a quarter of the reaction chamber was heated to 45° C. and the temperature in the remainder of the reaction chamber rise to 75° C.

The cracked gasoline introduced into the hydrogenation reactor and the hydrogenation product are compared below; the products investigated were merely inhibited in the usual manner:

| Substance investigated | Cracked gasoline used | Hydrogenation product |
|---|---|---|
| Colour | Yellow | Colourless. |
| Odour | Unpleasant | Aromatic, pleasant. |
| Density $d_{20}$ | 0.772 | 0.766. |
| Bromine number (g.Br/100 g.) | 65.0 | 45.7. |
| Gum before ageing (mg./100 cc.) | 2 | 1. |
| Gum after ageing (mg./100 cc.) | 4,886 | 2. |
| Induction time (min.) (after ASTM D 525–49) | 75 | >240. |
| Octane number (ROZ without lead) | 95.6 | 94.8. |
| Octane number (ROZ+0.04% TEL) | >100 | >100. |
| Content of diolefinic compounds (weight percent) | 16.6 | <1. |

It should particularly be noted that in spite of the higher temperature at the end of the reaction there is no increase in the residue from evaporation (gum), so that hydrogenation of the compounds which tend to polymerize was always more rapid than polymerization. The hydrogenation product may be used as motor fuel without redistillation. Moreover, if it is desired to remove all the olefinic compounds from the raffinate, the latter may easily be hydrogenated in the gaseous phase over suitable known catalysts, whereas the untreated crude gasoline distillate prevents hydrogenation of the gaseous phase by formation of polymers.

We claim:

1. In the process for the selective hydrogenation treatment of gum formers contained in gasoline boiling range hydrocarbon fractions in which the fraction treated is trickled through a bed of solid supported noble metal hydrogenation catalyst in contact with hydrogen, the improvement which comprises controlling the temperature so that the fraction treated is initially trickled over and in contact with the hydrogenation catalyst and hydrogen through at least ¼ of the hydrogenation catalyst bed at a temperature below 50 degrees C. and prior to completion of the hydrogenation as the fraction trickles down further through the catalyst bed, the temperature is increased to a value in the range from 50 degrees C. up to 100 degrees C.

2. Improvement according to claim 1, wherein said temperature increase is to about 75 degrees C.

3. Improvement according to claim 1 wherein the hydrocarbon fraction treated is introduced into the bed of solid hydrogenation catalyst at a temperature between 25 and 35 degrees C.

4. Improvement according to claim 1 wherein the hydrogenation catalyst used is a noble metal catalyst on a macroporous support material which has an intrinsic surface of less than approximately 50 m.$^2$/g. with a water absorption capacity of at least 10%.

5. Improvement according to claim 1 wherein said hydrocarbon fraction is a cracked gasoline from the pyrolysis of liquid hydrocarbons.

6. Improvement according to claim 1 wherein said hydrocarbon fraction is a cracked gasoline from the pyrolysis of liquefiable hydrocarbons.

References Cited by the Examiner

UNITED STATES PATENTS

| 2,365,751 | 12/44 | Drennan | 208—143 |
| 2,402,493 | 6/46 | Greensfelder et al. | 260—677 |
| 2,608,521 | 8/52 | Hoog | 208—213 |
| 2,927,141 | 3/60 | Cohn et al. | 260—677 |
| 2,944,094 | 7/60 | Rylander et al. | 260—677 |
| 2,946,829 | 7/60 | Likins et al. | 260—677 |
| 2,956,090 | 10/60 | Liethen et al. | 260—677 |
| 3,075,915 | 1/63 | Kronig et al. | 208—255 |

ALPHONSO D. SULLIVAN, *Primary Examiner.*